(12) United States Patent
Gabay et al.

(10) Patent No.: US 9,043,184 B1
(45) Date of Patent: May 26, 2015

(54) SYSTEM AND METHOD FOR IDENTIFYING UNDERUTILIZED STORAGE CAPACITY

(75) Inventors: Yarom Gabay, Newton, MA (US); Francisco Jose Assis Rosa, Sudbury, MA (US); Ran Gilboa, Cambridge, MA (US)

(73) Assignee: NetApp, Inc., Sunnyvale, CA (US)

( * ) Notice: Subject to any disclaimer, the term of this patent is extended or adjusted under 35 U.S.C. 154(b) by 682 days.

(21) Appl. No.: 13/272,138

(22) Filed: Oct. 12, 2011

(51) Int. Cl.
*G06F 11/30* (2006.01)
*G05B 23/02* (2006.01)

(52) U.S. Cl.
CPC ........................... *G05B 23/02* (2013.01)

(58) Field of Classification Search
USPC ........................................................ 702/183
See application file for complete search history.

(56) References Cited

U.S. PATENT DOCUMENTS

| | | | | |
|---|---|---|---|---|
| 6,446,141 | B1 * | 9/2002 | Nolan et al. ....................... | 710/8 |
| 6,530,036 | B1 * | 3/2003 | Frey, Jr. ......................... | 714/6.31 |
| 7,941,459 | B1 * | 5/2011 | Erickson ........................ | 707/803 |
| 8,260,831 | B2 * | 9/2012 | Tyrrell et al. .................... | 707/823 |
| 8,645,654 | B1 * | 2/2014 | Bailey et al. .................... | 711/165 |
| 2003/0188045 | A1 * | 10/2003 | Jacobson ........................ | 710/1 |
| 2003/0233518 | A1 * | 12/2003 | Yamagami et al. ............ | 711/114 |
| 2004/0267897 | A1 * | 12/2004 | Hill et al. ....................... | 709/217 |
| 2005/0097275 | A1 * | 5/2005 | Korgaonkar .................... | 711/114 |
| 2006/0265497 | A1 * | 11/2006 | Ohata et al. .................... | 709/224 |
| 2007/0226348 | A1 * | 9/2007 | Grabarnik et al. .............. | 709/227 |
| 2007/0260834 | A1 * | 11/2007 | Kavuri et al. ................... | 711/162 |
| 2008/0177964 | A1 * | 7/2008 | Takahashi et al. .............. | 711/162 |
| 2008/0281770 | A1 * | 11/2008 | Ricketts .......................... | 706/52 |
| 2009/0019251 | A1 * | 1/2009 | Helman et al. ................. | 711/171 |
| 2009/0138498 | A1 * | 5/2009 | Krishnamoorthy et al. ... | 707/103 R |
| 2010/0036850 | A1 * | 2/2010 | Garman et al. ................. | 707/10 |
| 2010/0094990 | A1 * | 4/2010 | Ben-Yehuda et al. ......... | 709/224 |
| 2010/0146013 | A1 * | 6/2010 | Mather .......................... | 707/803 |
| 2010/0281546 | A1 * | 11/2010 | Kruse et al. ..................... | 726/32 |
| 2010/0332818 | A1 * | 12/2010 | Prahlad et al. ................. | 713/150 |
| 2013/0268520 | A1 * | 10/2013 | Fisher et al. ................... | 707/723 |

* cited by examiner

*Primary Examiner* — Sujoy Kundu
*Assistant Examiner* — Alvaro Fortich
(74) *Attorney, Agent, or Firm* — Kacvinsky Daisak Bluni PLLC

(57) ABSTRACT

Described herein is a system and method for detecting underutilized capacity within a storage system environment. The technique comprises collecting performance data of various storage objects within a storage system environment for various performance measures at designated time intervals. The collected performance data may be formatted and stored to a database. One or more parameters may be received specifying at least one performance measure, at least one threshold value, and/or at least one time period. The performance data for target storage objects may be analyzed according to the received parameters to determine any underutilized storage objects. A report may be generated according to the parameters listing the storage objects and address locations of any underutilized storage objects. The report may comprise various information corresponding to the underutilized storage object, such as the business units, tiers, data centers, and levels of service they are associated with.

21 Claims, 13 Drawing Sheets

FIG.9

Underutilized Capacity

IOPS < 1000

Start Date: Feb 23, 2011   End Date: March 2, 2011

| Sub-section | Application | Tier | Storage | Volume | Raw Capacity (GB) | Allocated Capacity (GB) |
|---|---|---|---|---|---|---|
| NAppU2 (Business Unit) | ABCD | 2.GOLD | USP 10148-PLATINUM | 15:EB | 70.00 | 60.00 |
| | | | | 16:92 | 1.20 | 1.00 |
| | | 3.SILVER | AMS 5005-75010562-A | 409 | 58.34 | 50.00 |
| NAppTier6 (Tier) | Blamoir | 2.GOLD | USP 10148-PLATINUM | 12:43 | 291.67 | 250.00 |
| | | | | 12:E4 | 285.72 | 50.00 |
| | | | | 19:E5 | 58.34 | 50.00 |
| | | | | 19:E6 | 58.34 | 50.00 |
| | | | | 19:E7 | 58.34 | 50.00 |
| | | | | 19:E8 | 58.34 | 50.00 |
| | | | | 19:EA | 58.34 | 50.00 |
| | | | | 19:EB | 58.34 | 50.00 |
| | | | | 19:EC | 58.34 | 50.00 |
| | | | | 19:EF | 58.34 | 50.00 |
| | | | | 19:F0 | 58.34 | 50.00 |
| | | | | 18:3F | 58.34 | 50.00 |
| | Business Modelling | 1.Platinum | USP 10148-PLATINUM | 05:02 | 150.61 | 131.78 |

FIG.10

SYSTEM AND METHOD FOR IDENTIFYING UNDERUTILIZED STORAGE CAPACITY

FIELD OF THE INVENTION

Embodiments of the present invention relate to storage systems, and in particular, to detection of unused or underutilized capacity within a storage system.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of storage objects, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many servers. In some embodiments, the storage system architecture provides one or more aggregates, each aggregate comprising a set of one or more storage devices (e.g., disks). Each aggregate may store one or more storage objects, such as one or more volumes. The aggregates may be distributed across a plurality of storage systems interconnected as a cluster. The storage objects (e.g., volumes) may be configured to store content of storage objects, such as files and logical units, served by the cluster in response to multi-protocol data access requests issued by servers.

Each storage system (node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

Each server may be within a specific storage site and each storage site may comprise multiple servers. Moreover, each server may execute numerous applications requiring the data services of the cluster. The data services of each server may be stored in data aggregates, such as flexible volumes. The data aggregates or flexible volumes may comprise a flexible volume hierarchy that may define a relationship between flexible volumes. For example, the flexible volume hierarchy may contain flexible volumes and clones of flexible volumes that relate to a base flexible volume.

The frequency with which storage objects within the system are accessed varies according to the usage patterns of the system, applications, and client devices that access the data stored on the storage objects. Permanent changes in the average level of utilization of a particular storage object may result from a variety of factors, including configuration changes within the system, configuration changes within the applications, or deprecation of application features. It is desirable to identify underutilized capacity within a storage system so as to efficiently re-allocate storage objects that are unused or accessed infrequently.

Though storage capacity that is dormant may sometimes be detected by, for example, tracking configuration changes that result in the deletion of a path, masking, or mapping to a storage object, capacity that becomes underutilized due to other, more subtle factors can be more difficult to identify. In one common scenario, a particular storage volume may only contain data pertaining to one application. If use of the application is discontinued or drastically reduced, the storage volume may become underutilized even though no configuration changes to the system have occurred. Thus, there is a need for a system and method that allows underutilized storage capacity within a storage system to be detected and identified.

SUMMARY OF THE INVENTION

The embodiments described herein provide a system and method for identifying underutilized storage capacity within a storage environment. According to some embodiments, the environment comprises one or more server systems, one or more storage systems, one or more client systems, a data acquisition engine, a data analysis engine, and a data warehouse. The data acquisition engine and the data analysis engine may reside and execute on separate dedicated servers, or be distributed over one or more server systems, storage systems, or client systems.

In some embodiments, the data acquisition engine connects to the various storage objects in the storage environment and samples their performance at designated intervals. The data gathered by the data acquisition engine may comprise performance data of various performance measures, such as Input/Output Operations Per Second (IOPS). A storage object may comprise a storage array, a volume, a logical unit, a storage device, or any other container for storing data. In these embodiments, the data acquisition engine may collect and store performance data for a plurality of storage objects in the storage environment.

The data acquisition engine may continually send collected performance data to the data analysis engine which then formats the performance data into a schema, analyzes the formatted performance data, and stores the formatted performance data to a data warehouse. For example, the schema may include data structures and data fields for storing and organizing performance data of various performance measures (e.g., response time, throughput, IOPS, etc.) of a plurality of storage objects. The schema may further include data structures for storing and listing information regarding the storage objects, such as the business units, tiers, data centers, and levels of service they are associated with.

The data analysis engine analyzes the formatted performance data to identify underutilized storage objects within the system. In some embodiments, underutilized storage objects are identified based on parameters received from a user on a client machine. The received parameters may identify, for example, particular performance measures, threshold values, and time periods to be used for identifying underutilized storage objects. For example, in some embodiments, underutilized storage objects are identified by computing the average performance of storage objects over the course of a time period, comparing the average performance of the storage objects to a threshold value, and flagging storage objects whose average performance falls below the threshold. The data analysis engine generates a report listing underutilized storage objects and transmits it to the client.

Some embodiments comprise receiving performance data for a target storage object (a storage object being analyzed) and receiving one or more parameters specifying at least one performance measure, at least one threshold value, and/or at least one time period. In some embodiments, using the performance data for the target storage object, an average performance value for the specified performance measure over the specified time period may be determined. In some embodiments, if the average performance value is determined to fall below the specified threshold value, the target storage object is designated as an underutilized storage object. A report may also be generated comprising information corresponding to the underutilized storage object.

In some embodiments, the performance measure comprises Input/Output Operations Per Second (IOPS). In other embodiments, other performance measures may be used, such as Throughput, Response Time, etc. In some embodiments, a plurality of performance measures may be specified in the parameters for determining an underutilized storage object. The storage objects may comprise storage arrays, volumes, or logical units, and may be associated with at least one of a business unit, a tier, and a data center. The procedure of receiving the performance data may comprise connecting to the storage object and collecting performance data using a designated sampling interval. The performance data may further be formatted using a schema and stored to a data warehouse.

BRIEF DESCRIPTION OF THE DRAWINGS

FIG. 9 depicts an exemplary user interface screen for generating a report according to an embodiment.

FIG. 10 depicts an exemplary report identifying underutilized capacity according to an embodiment.

DETAILED DESCRIPTION

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I describes a cluster storage system environment in which some embodiments operate. Section II describes a system and method for detecting underutilized storage capacity within a storage system environment. Section III describes the computer implementation of various embodiments of the invention.

I. Cluster Storage System Environment

Figure 1:
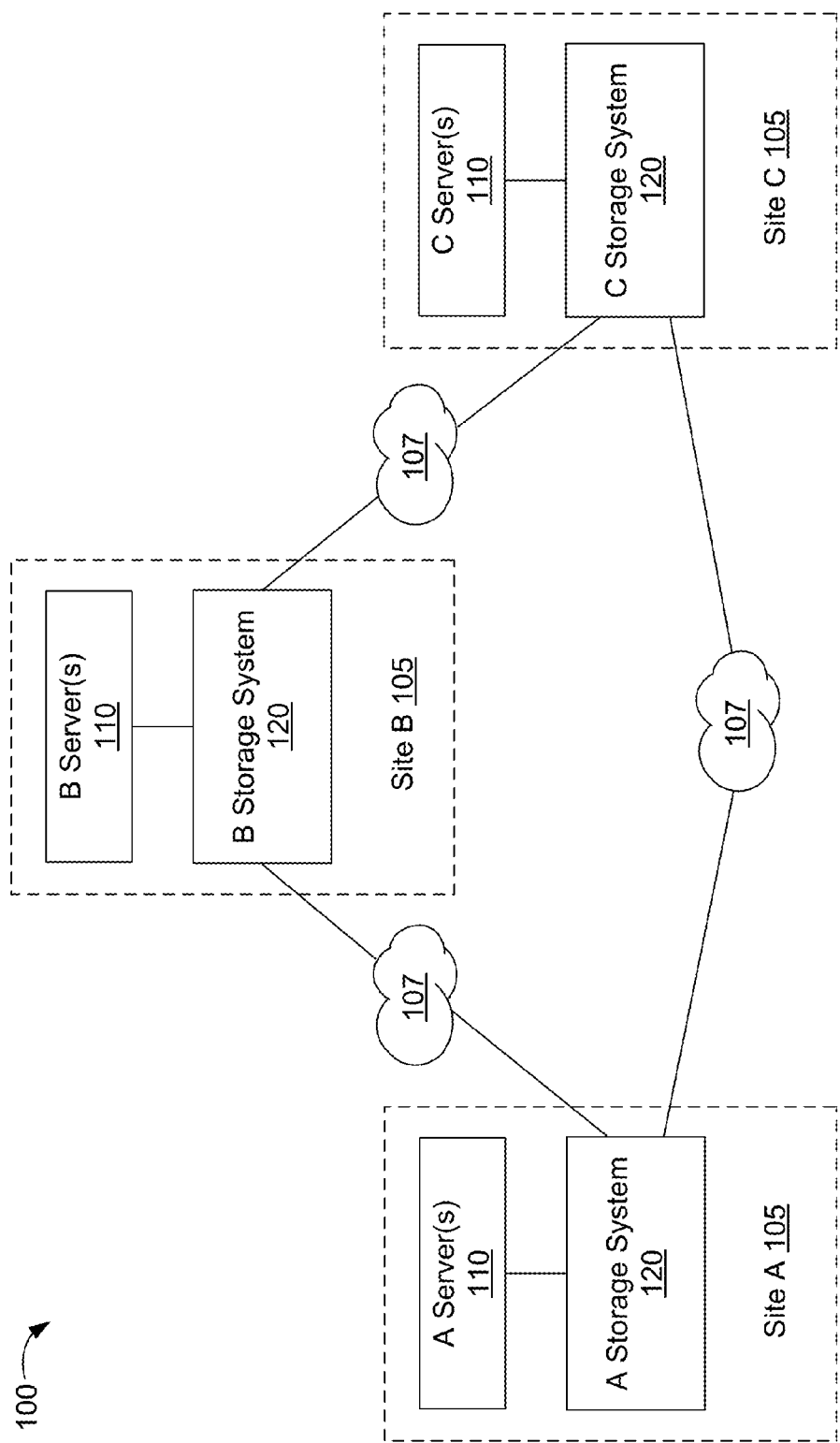
FIG. 1 depicts a schematic diagram of an exemplary distributed storage system environment in which some embodiments operate.

FIG. 1 is a schematic diagram of an exemplary distributed storage system environment 100 in which some embodiments operate. The environment 100 comprises a set of sites 105 (e.g., sites A, B, C) connected by a connection system 107. Each site 105 comprises a set of server systems 110 and a storage system 120. As such, each site 105 may comprise a separate cluster storage system environment. The connection system 107 may comprise a network, such as a Local Area Network (LAN), Wide Area Network (WAN), metropolitan area network (MAN), the Internet, or any other type of network or communication system between computer systems. In some embodiments, each site 105 may be located, for example, at great distances from each other and in different geographic regions (e.g., in different states, countries, etc.).

In these embodiments, the connection system 107 may comprise, for example, a WAN or the Internet. The various sites 105 may be connected with each other through the storage systems 120 of the various sites 105, whereby a storage system 120 of a site 105 is connected with each storage system 120 of each of the other sites 105. The storage systems 120 may communicate directly with each other to receive and send access requests between the storage systems 120. The storage systems 120 may be considered peers in terms of network connectivity. In some embodiments, each storage system 120 may be identified by a unique identifier to distinguish each storage system 120 on the connection system 107. For example, each storage system 120 may be identified by an Internet Protocol (IP) address or domain name associated with the storage system 120 to locate the storage system 120 within a network.

Figure 2:
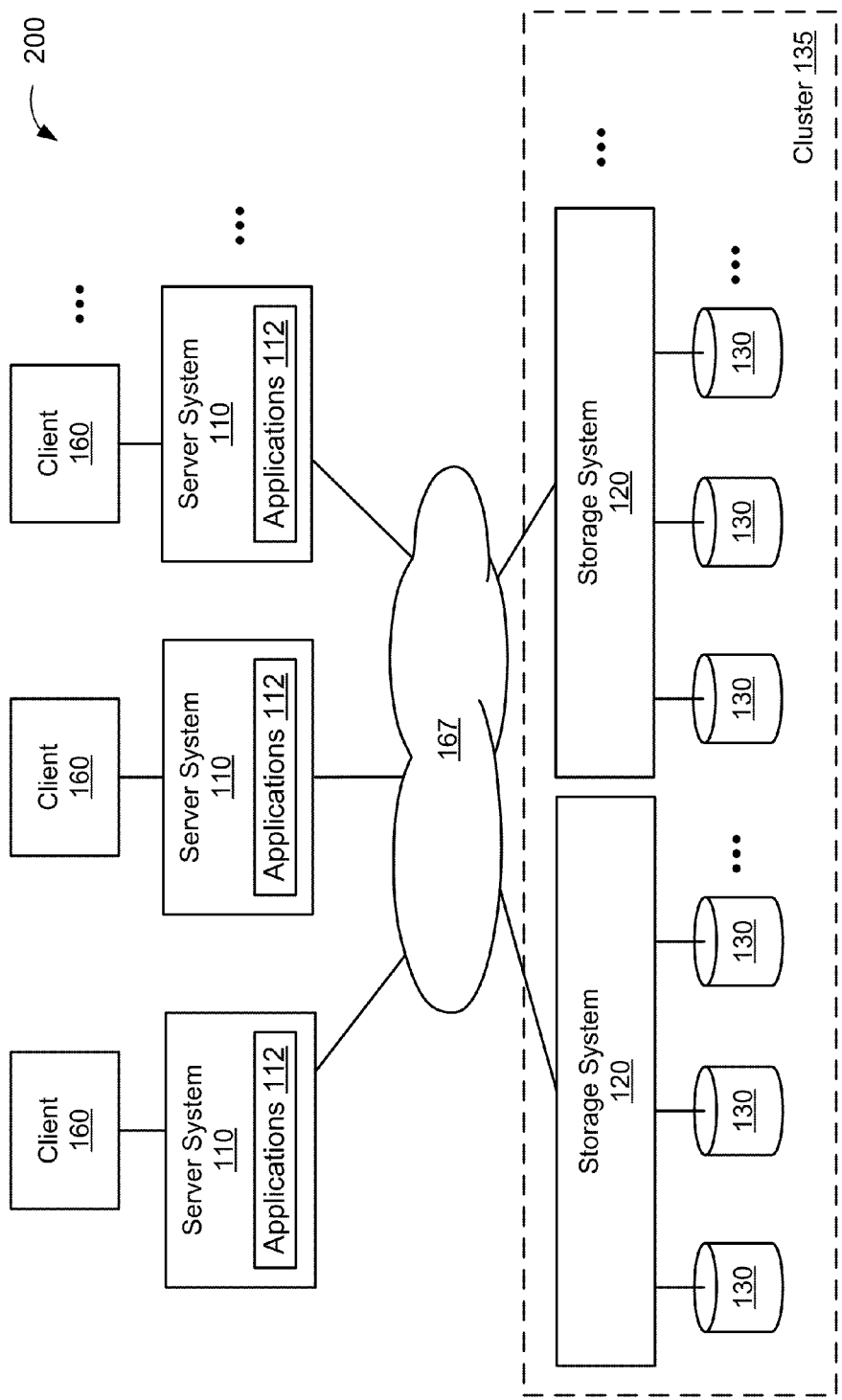
FIG. 2 depicts a block diagram of an exemplary virtual server environment in which some embodiments operate.

FIG. 2 is a block diagram of an exemplary virtual server environment 200 in which some embodiments operate. The environment 200 may comprise a set of one or more server systems and one or more storage systems 120. The server systems 110 may each access one or more storage systems 120 that are connected to the server systems 110 via a network 167. The one or more storage systems 120 comprise a cluster storage system 135. Each storage system 120 in the cluster 135 may comprise a set of storage devices 130 for storing client data, the storage devices 130 of the cluster 135 comprising a shared storage of the storage system 120. Note that the server systems 110 are also connected to each other (e.g., via network 167) for communicating with each other (e.g., for working collectively to provide data-access service to a user/client system (not shown) for collectively hosting a plurality of virtual machines as described herein).

A server system 110 may comprise a computer system that may execute one or more applications 112 that interact with the storage systems 120 for receiving read/write access requests and receiving or transmitting data over the network 167. In some embodiments, a server system 110 may comprise a chassis hosting multiple instances of server systems 110, each server system 110 hosting multiple client systems embodied as virtual machines. The network 167 and/or subnets of networks 167 may be physically embodied within such a chassis.

An application 112 executing on a server system 110 may provide data-access services by transmitting and processing access requests for data from the storage system(s) 120. An application 112 may provide data-access services by utilizing the services of the storage system 120 to access, store, and manage data in a set of storage devices 130. As such, a server system 110 may execute one or more applications 112 that submit access requests for accessing particular storage objects on the storage devices. Each application 112 may submit access requests for accessing particular storage objects on the storage systems of the cluster 135 and the cluster 135 may perform the received requests on the storage objects. An application 112 may comprises a non-virtual based application, such as a typical email exchange application or database application. In other embodiments, an application 112 may comprise a virtual-based application, such as a virtual machine (discussed below).

Communications between a storage system 120 and any of server systems 110 are typically embodied as packets sent over the computer network 167. A server system 110 may send an access request (a read/write access request) to the storage system 120 for accessing particular data stored on the storage system. The server system 110 may request the services of the storage system 120 by issuing storage-access protocol messages using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), or Internet Small Computer System Interface (iSCSI) Storage Area Network (SAN) access—when accessing data in the form of blocks.

Each application 112 executing on a server system 110 may utilize services of the cluster 135 to store and access its data. The storage system 120 may comprise a computer system that stores data in a set of one or more storage devices 130 as storage objects. A storage device 130 may comprise writable storage device media such as storage devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may comprise storage objects comprising one or more storage volumes, where each volume has a file system implemented on the volume. A file system may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

Figure 3:
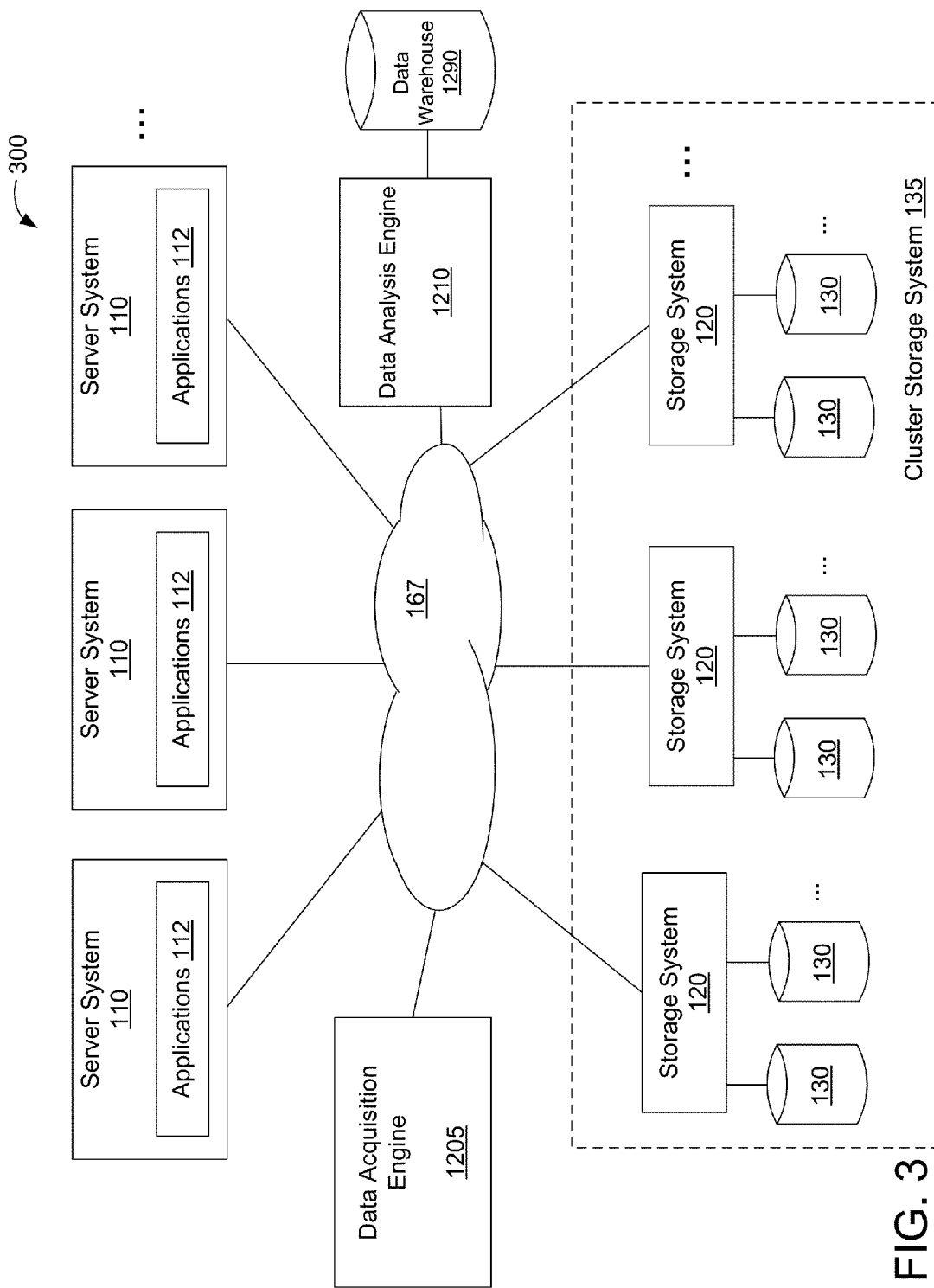
FIG. 3 depicts a schematic block diagram of an exemplary cluster storage system environment in which some embodiments operate.

FIG. 3 is a schematic block diagram of an exemplary cluster storage system environment 300 in which some embodiments operate. The environment 300 comprises a set of one or more server systems 110, a cluster 135 comprising a set of one or more storage systems 120, a data acquisition engine 1205, a data analysis engine 1210, and a data warehouse 1290 that are connected via a connection system 167. Each storage system 120 may have a distributed architecture. For example, each storage system 120 may include separate N module (network module) and D module (data module) components (not shown). In such an embodiment, the N module is used to communicate with the server systems 110, while the D module includes the file system functionality and is used to communicate with the storage devices 130. The storage system 120 may be coupled through a switching fabric (not shown) to other storage systems 120 in the cluster 135. In this way, all the storage systems 120 of the cluster 135 may be interconnected to form a single storage pool that may be accessed by the connected server systems 110.

The storage systems 120 comprise functional components that cooperate to provide a distributed storage system architecture providing consolidated data services to the server systems 110. A server system 110 may comprise a computer system that utilizes services of the cluster storage system 135 to store and manage data in the storage devices 130 of the storage systems 120. Interaction between a server system 110 and a storage system 120 can enable the provision of storage services. That is, server system 110 may request the services of the storage system 120, and the storage system 120 may return the results of the services requested by the server system 110, by exchanging packets over the connection system 167.

The storage system 120 may comprise a computer system that stores data in a set of storage devices 130, preferably on one or more writable storage device media (such as magnetic storage devices, video tape, optical, DVD, magnetic tape, and any other similar media adapted to store information, including data and parity information). The storage system 120 may implement a file system to logically organize the data as storage objects on the storage devices 130. A storage system 120 or a server system 110 may execute one or more applications 112 that submit access requests for accessing particular storage objects on the storage devices 130.

Figure 4A:
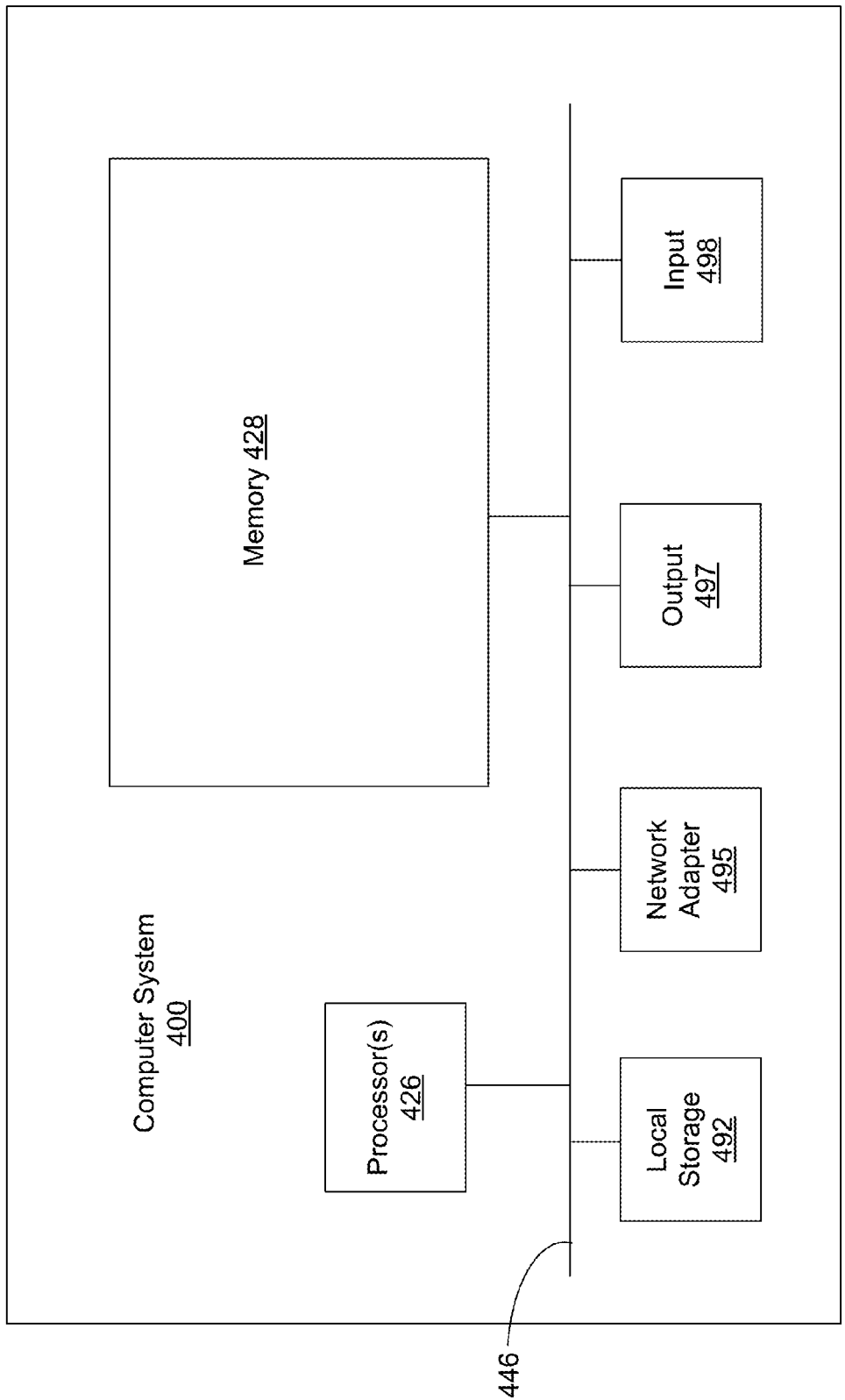
FIG. 4A depicts a schematic block diagram of an computer system according to an embodiment.

As described above, the storage system environment 300 may include one or more of a server system 110, a storage system 120, a data acquisition engine 1205, a data analysis engine 1210, a data warehouse 1290, and one or more client systems 160 coupled via a network 167. The client system 160 may be directly coupled to the server system 110 as depicted in FIG. 2 or coupled to the network 167. FIG. 4A depicts a schematic block diagram of an exemplary generic computer system 400 that may be configured as a server system 110, storage system 100, a data acquisition engine 1205, a data analysis engine 1210, or a client system 160 (described further below).

II. Capacity Utilization Detection

Each of the data acquisition engine 1205, data analysis engine 1210, and client system 160 may comprise various engines and/or modules that implement embodiments described herein. In one series of embodiments, the data acquisition engine 1205 may include a scheduler 1215, a settings module 1217, and a performance data collection module 1220. The data analysis engine 1210 may include a data processing module 1230 and data analysis & reporting module 1235. The client system 160 may include a client application 1250, configuration module 1260, and a user interface module 1265.

Figure 4B:
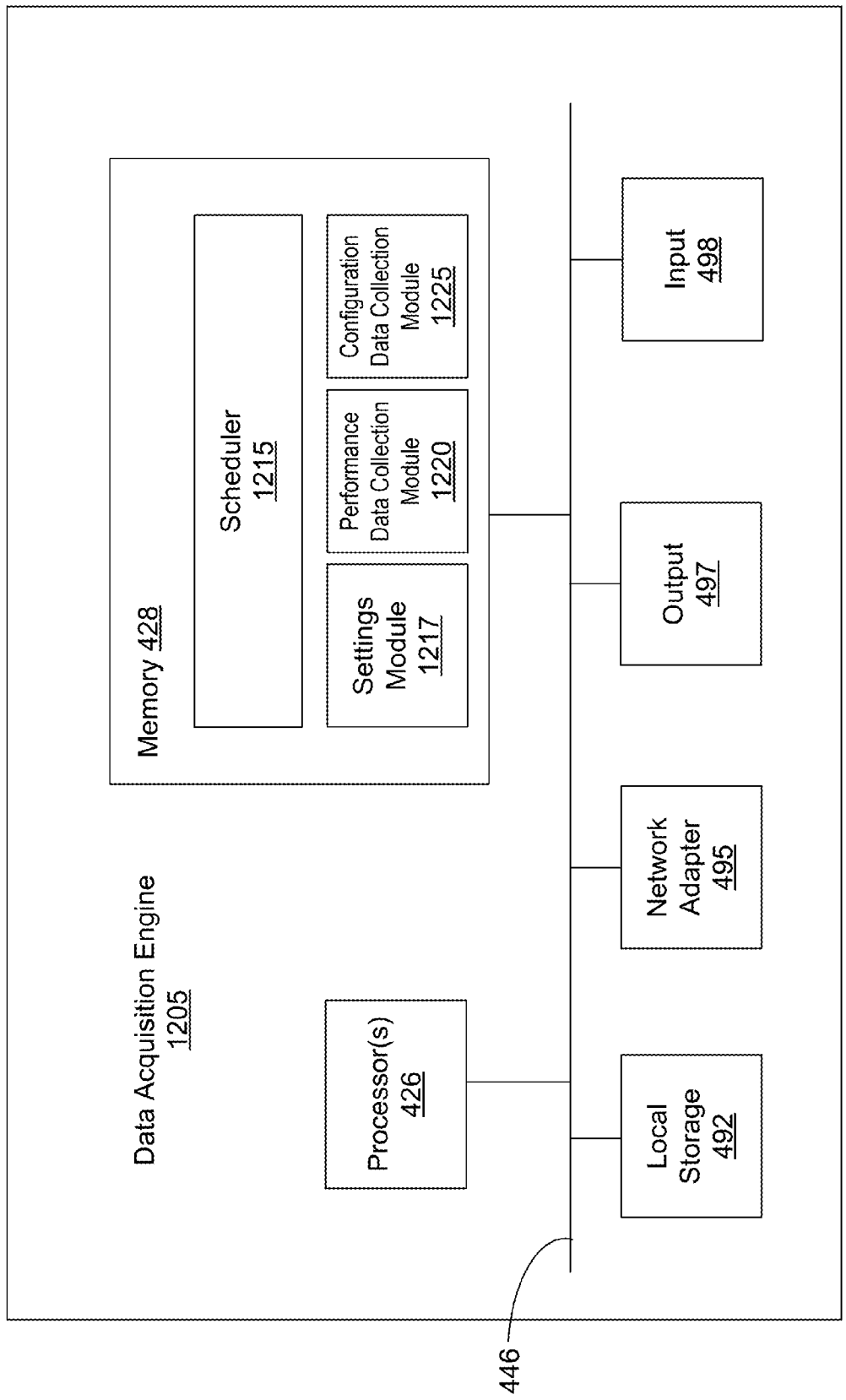
FIG. 4B depicts a schematic block diagram of an exemplary computer system configured as a data acquisition engine according to an embodiment.
Figure 4C:
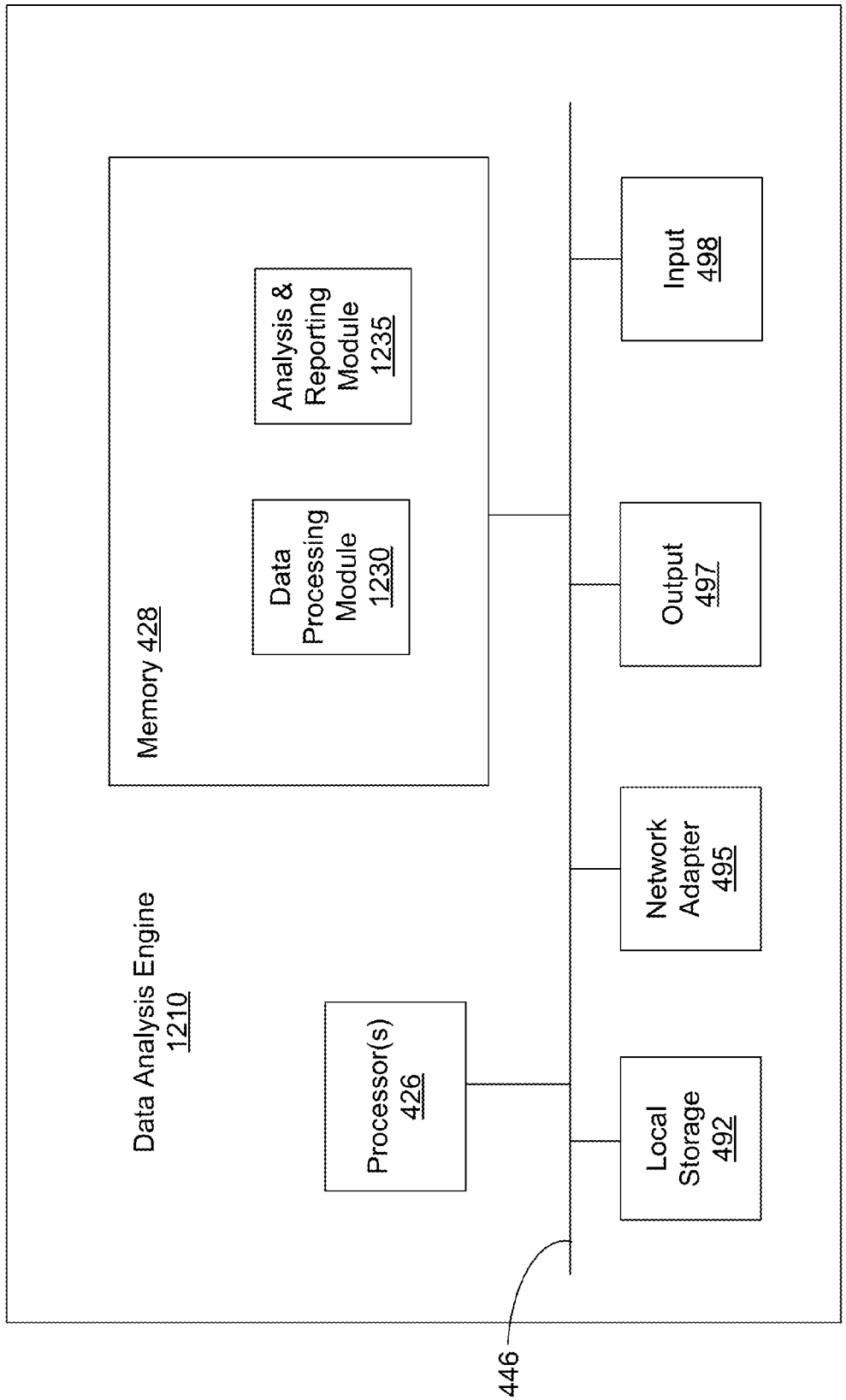
FIG. 4C depicts a schematic block diagram of an exemplary computer system configured as a data analysis engine according to an embodiment.
Figure 4D:
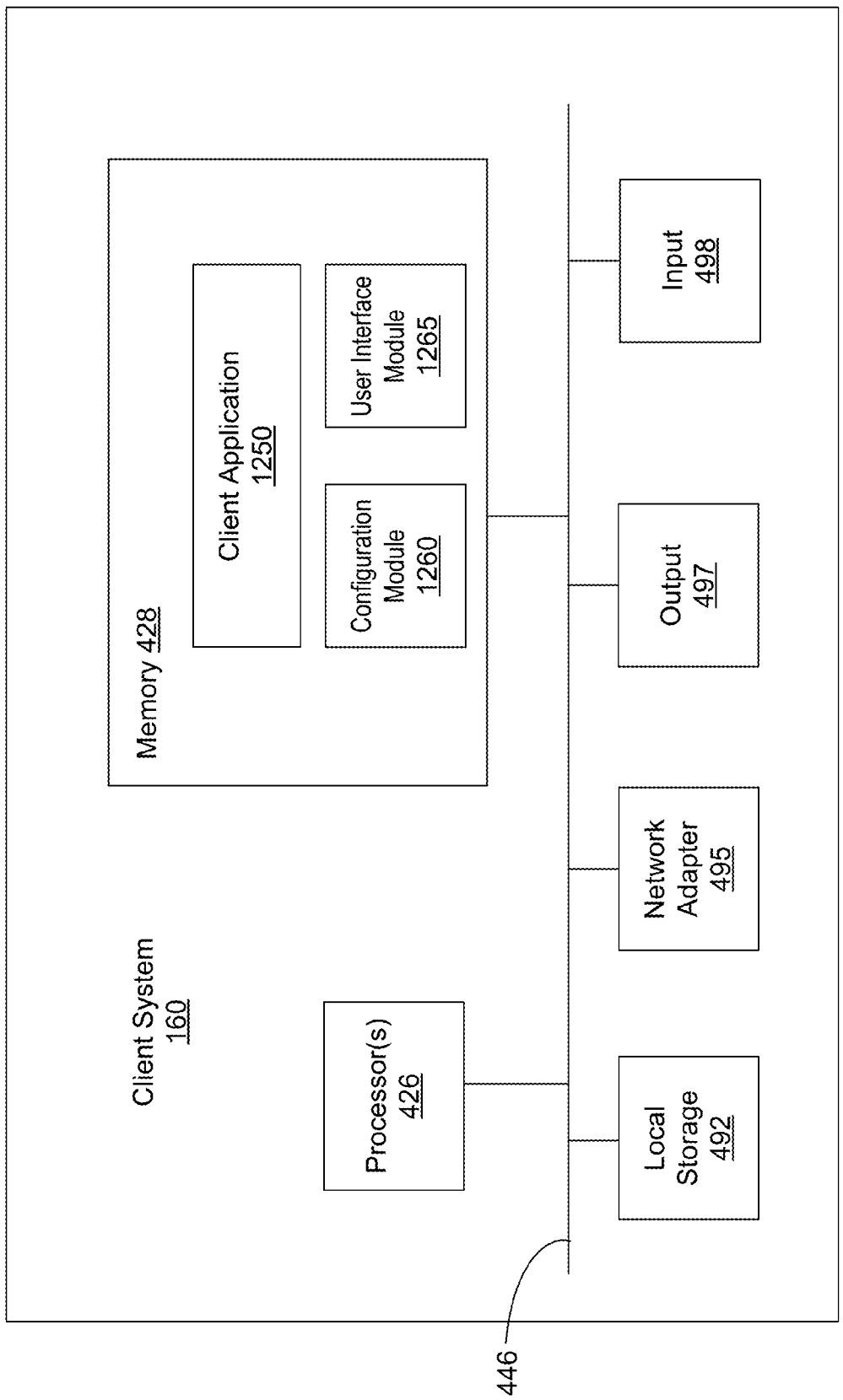
FIG. 4D depicts a schematic block diagram of an exemplary computer system configured as a client according to an embodiment.

Specific embodiments in which the computer system 400 is configured as a data acquisition engine 1205, a data analysis engine 1210, and a client 160 are illustrated in FIGS. 4B, 4C, and 4D, respectively. In some embodiments, the computer system 400 may comprise a dedicated machine (comprising hardware and/or software components) configured as a data acquisition engine 1205, a data analysis engine 1210, or a client 160 that is external and separate from the server systems 110 and the storage systems 120. In other embodiments, the computer system 400 may be configured to perform a part or a combination of the functions of a data acquisition engine 1205, a data analysis engine 1210, a client 160, a server system 110, or a storage system 120. According to these embodiments, the various engines and/or modules of the data acquisition engine 1205, the data analysis engine 1210, or client system 160 may be distributed across multiple computer systems 400 configured to perform a variety of functions. Any configuration of components may be used without deviating from the spirit or scope of the invention.

A. Data Acquisition Engine

As described above, according to some embodiments, the environment includes a data acquisition engine 1205. In one series of embodiments, the data acquisition engine 1205 receives unfiltered performance data from the various storage objects within the environment, such as hardware and/or software storage components of one or more server systems 110 and/or one or more storage systems 100. According to this series of embodiments, the data acquisition engine 1205 acts as the conduit between the various storage objects in the system and the data analysis engine 1210, which further processes the unfiltered performance data. As illustrated in FIG. 4B, in embodiments in which computer system 400 is configured as a data acquisition engine 1205, the memory 428 may comprise a scheduler 1215, a settings module 1217, and a performance data collection module 1220. The data acquisition engine 1205 may comprise a single machine or multiple machines; in embodiments incorporating multiple data acquisition engines, each data acquisition engine 1205 may collect data from a subset of the storage objects within the environment.

Figure 5:
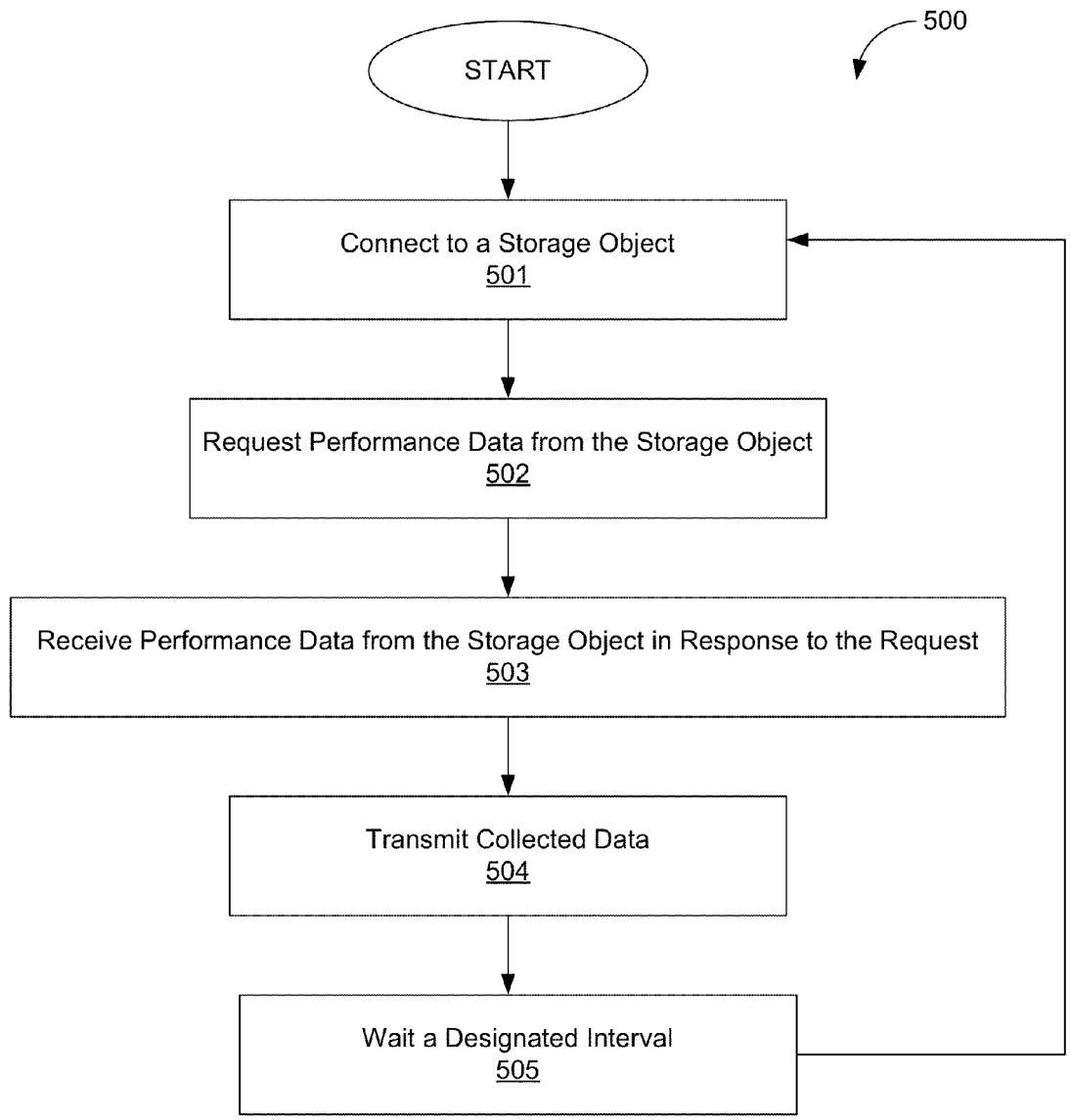
FIG. 5 depicts a flow diagram illustrating a performance data sampling procedure according to an embodiment.

The polling procedure of the data acquisition engine 1205 is illustrated according to an embodiment by the flow diagram 500 depicted in FIG. 5. At step 501, the data acquisition engine connects to a storage object. This step may be executed by the performance data collection module 1220 upon receiving a command from the scheduler 1215 to retrieve data corresponding to a storage object within the environment. The command may include an identifier corresponding to the storage object. The command may further include a directive to retrieve data pertaining to the storage object and its related storage objects or sub-objects all at once. The storage object may be a disk array, a storage array, an internal volume, an external volume, or any other discrete storage component within the environment. Any medium for storing data may be used without deviating from the spirit or scope of the invention. At step 502, the performance data collection module 1220 requests performance data from the storage object. According to one series of embodiments, the "performance" of a particular computing component may comprise a specific measurable performance metric. In one such embodiment, performance is measured by Input/Output Operations Per Second (IOPS). In another embodiment, performance is measured by response time. Response time is the time delay between the time when an access request is submitted to the storage object, and when the access request is completed on the storage object. For storage objects, longer response times typically indicate greater utilization of the storage object, whereas shorter response times indicate less utilization of the storage object. Any performance measure may be used without deviating from the spirit or scope of the invention. At step 503, the performance data collection module 1220 receives performance data from the storage object in response to the request. At step 504, the data acquisition engine transmits the collected data to the data analysis engine 1210. At step 505, the data acquisition engine waits a predetermined designated sampling interval, then returns to step 501 to repeat the procedure. The interval may be specified by a user or administrator in advance in a user interface during a configuration phase (described further below).

According to one embodiment, the procedure of the flow diagram 500 depicted in FIG. 5 is regulated by the scheduler 1215. In this embodiment, the scheduler 1215 acts as the operational "hub" of the data acquisition engine. The scheduler 1215 sends commands to the performance data collection module 1220 in accordance with configuration parameters specified by a user or an administrator in a user interface. These configuration parameters may include a sampling interval specifying the increments at which the data acquisition engine collects performance data, as described in relation to step 505 above. The scheduler receives these configuration parameters from the settings module 1217.

The settings module 1217 comprises configuration parameters specified by a user or administrator via a user interface. The configuration parameters may include the sampling interval that the performance data collection module 1220 allows to lapse in step 505 of flow diagram 500 before repeating the procedure. The configuration parameters may be specific to a particular storage object within the environment or pertain to the data collection process in general.

B. Data Analysis Engine

According to some embodiments, the environment includes a data analysis engine 1210. In one series of embodiments, the data analysis engine 1210 receives unfiltered performance data corresponding to the various storage objects within the storage system environment 300, stores the data in a data warehouse 1290, identifies underutilized capacity, and generates a report upon user request. In one series of embodiments, the data analysis engine 1210 is a component of server 110 and receives requests for reports on underutilized capacity within the system from one or more of clients 160. The data analysis engine 1210 receives and processes the unfiltered performance data from the data acquisition engine 1205 (in order to identify underutilized capacity) and transmits the processed data in the form of a report upon request to a client 160.

As illustrated in FIG. 4C, in embodiments in which the computer system 400 is configured as a data analysis engine, the memory 428 may include a data processing module 1230 and an analysis & reporting module 1235. According to some embodiments, the data analysis engine 1210 may also include a user interface module (not pictured). In embodiments in which the data analysis engine 1210 does not contain a user interface module, user interface functionality is provided by a client 160 (described further below).

Data transmitted by the data acquisition engine 1205 is received by the data processing module 1230 and stored in the data warehouse 1290. The data warehouse 1290 may be directly connected to the data analysis engine 1210 or located remotely and accessible via network 167. Alternatively, the data may be stored in the data analysis engine's local storage 492 or in networked storage located within a different machine (not pictured). Any location or storage object may be used for storing the data without deviating from the spirit or scope of the invention. The data processing module 1230 processes the unfiltered performance data by extracting and formatting the data in accordance with one or more database schemas. A database schema catalogs the performance data in a standardized format such that it may be easily accessed and transmitted in the form of a report and underutilized capacity may be readily identified. The analysis & reporting module 1235 generates reports of the data in accordance with user specifications (described further below).

Figure 6:
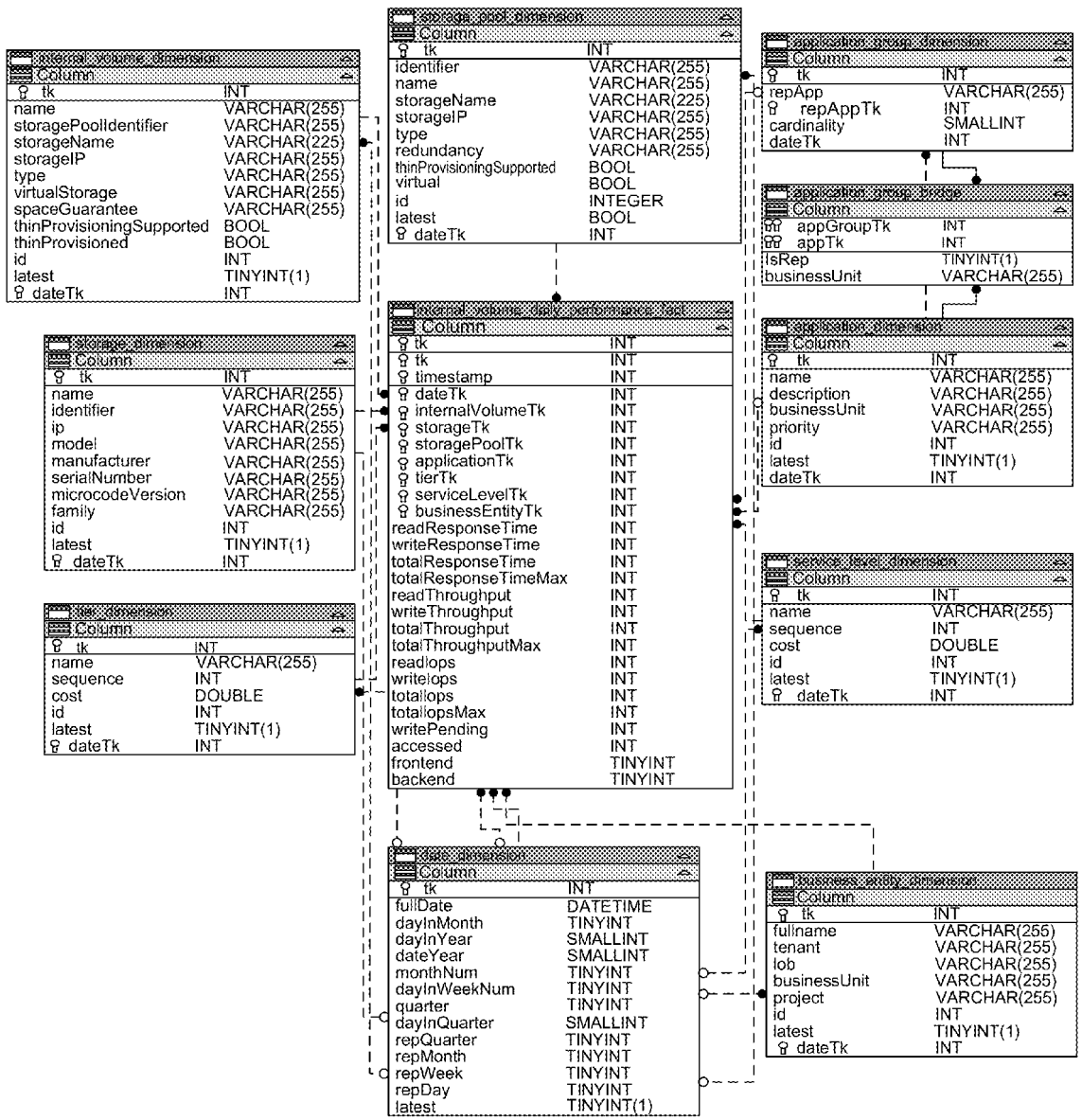
FIG. 6 depicts a block diagram illustrating an exemplary database schema according to an embodiment.

An example schema is illustrated in FIG. 6. FIG. 6 depicts a database schema 600 corresponding to the daily performance of internal storage volumes within storage system environment 300. Each storage volume is uniquely identified by the primary key tk. The table internal_volume_daily_performance_fact is the main fact table for the data mart. The response time fields (readResponseTime, writeResponseTime, totalResponseTime, totalResponseTimeMax) represent the time between the receipt of a read/write request and the transmission of a response. TotalResponseTime represents the sum of the read and write response times while totalResponseTimeMax represents the maximum observed read and write response time for the sampling period. The IOPS fields (readIops, writeIops, totalIops, totalIopsMax) represent the number of input/output operations per second during read/write operations. TotalIops represents the sum of read and write IOPS while totalIopsMax represents the maximum observed read and write IOPS for the sampling period. The throughput fields (readThroughput, writeThroughput, totalThroughput, totalThroughputMax) represent the data exchanged per second during read/write operations. TotalThroughput represents the sum of read and write throughput while totalThroughputMax represents the maximum observed read and write throughput for the sampling period. WritePending represents the average number of writes that are in a pending state for a given storage object. Accessed indicates whether the given capacity has been accessed at all or not for a given sampling period. While in some cases performance values can be low enough to imply that capacity is not accessed, accessed confirms whether any access has actually occurred, low or not. Frontend and backend indicate whether the given storage object comprises frontend or backend capacity.

The internal_volume_dimension table provides a listing of internal volumes in the system and contains enough information to clearly identify each storage volume or block of capacity for performance sampling. The storage_dimension table lists the storage objects to which an internal volume belongs to and allows for grouping of performance measures by storage-specific capacity. The storage_pool_dimension table lists aggregations of disks and internal volumes within a storage. The tier_dimension table lists types of capacity along with their level of performance and cost. Coupled with the performance data, this table cam provide overall cost information per capacity being accessed. The service_level_dimension table lists contracted service levels of each internal volume, reflected in performance and cost. This table may not necessarily represent the actual performance and cost level of a storage object, but rather the contracted level service and its associated cost. The table business_entity_dimension lists the business entities in the system that each storage object is associated with. This table represents a hierarchy corresponding to tenant, line of business (LOB), business unit and project. The application_dimension table lists the applications in the system using the various internal volumes. This data can be used for accountability and behavior analysis purposes. The table application_group_dimension lists groups of applications using the various internal volumes. The application_group_bridge table lists the elements in an application group. The date_dimension table lists the dates for occurrence of fact and allows for filtering events on date ranges.

The schema illustrated in FIG. 6 is exemplary. Other schemas may be used without deviating from the spirit or scope of the invention.

Figure 7:
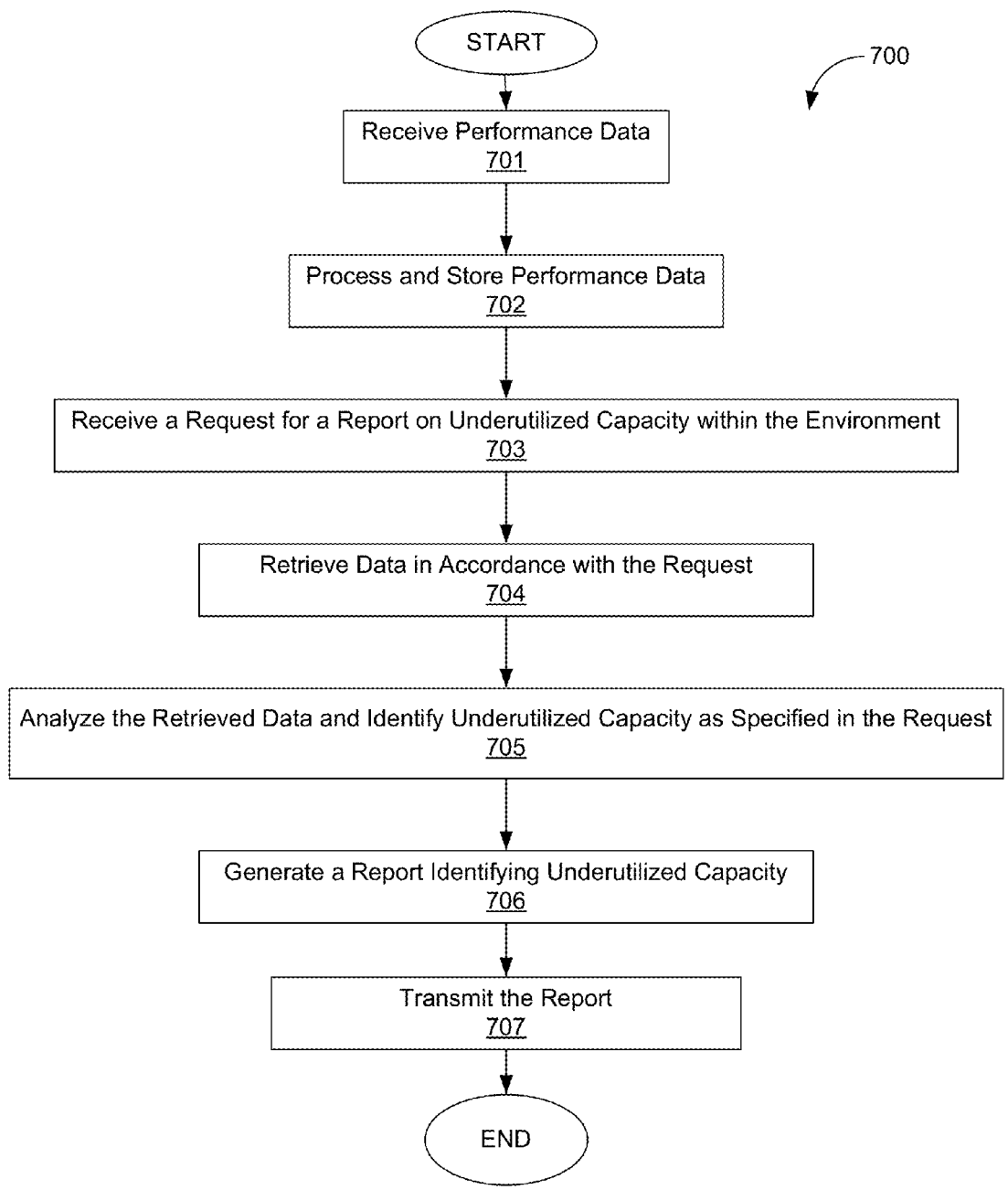
FIG. 7 depicts a flow diagram illustrating a performance data analysis procedure according to an embodiment.

The operation of the data analysis engine 1210 according to an embodiment is illustrated in further detail by the flow diagram 700 depicted in FIG. 7. At step 701, the data analysis engine 1210 receives performance data for various performance measures pertaining to various target storage objects (storage objects being analyzed) within the system from the data acquisition engine 1205. Step 701 may be performed at the same time in parallel with the remaining steps. The performance data may comprise values for various performance measures of various storage objects as well as configuration metadata pertaining to the sampling process (e.g., sampling interval). At step 702, the performance data is processed and stored in data warehouse 1290 in accordance with an applicable schema. At step 703, a request for a report on underutilized capacity within the environment is received from a client 160. According to one embodiment, the request may specify a business unit, a tier or data center, a subset of storage objects, a time range, and/or various performance and configuration parameters. The request may specify a performance measure and a weight to be assigned to that performance measure. The request may further specify that the user wishes to ascertain information about underutilized capacity corresponding to criteria contained therein. At step 704, the analysis & reporting module 1235 retrieves data in accordance with the request from the client. At step 705, the analysis & reporting module 1235 analyzes the retrieved data and identifies underutilized capacity as specified in the request. At step 706, the analysis & reporting module 1235 generates a report identifying underutilized capacity and listing the information requested by the user. At step 707, the report is transmitted to the client 160.

Figure 8:
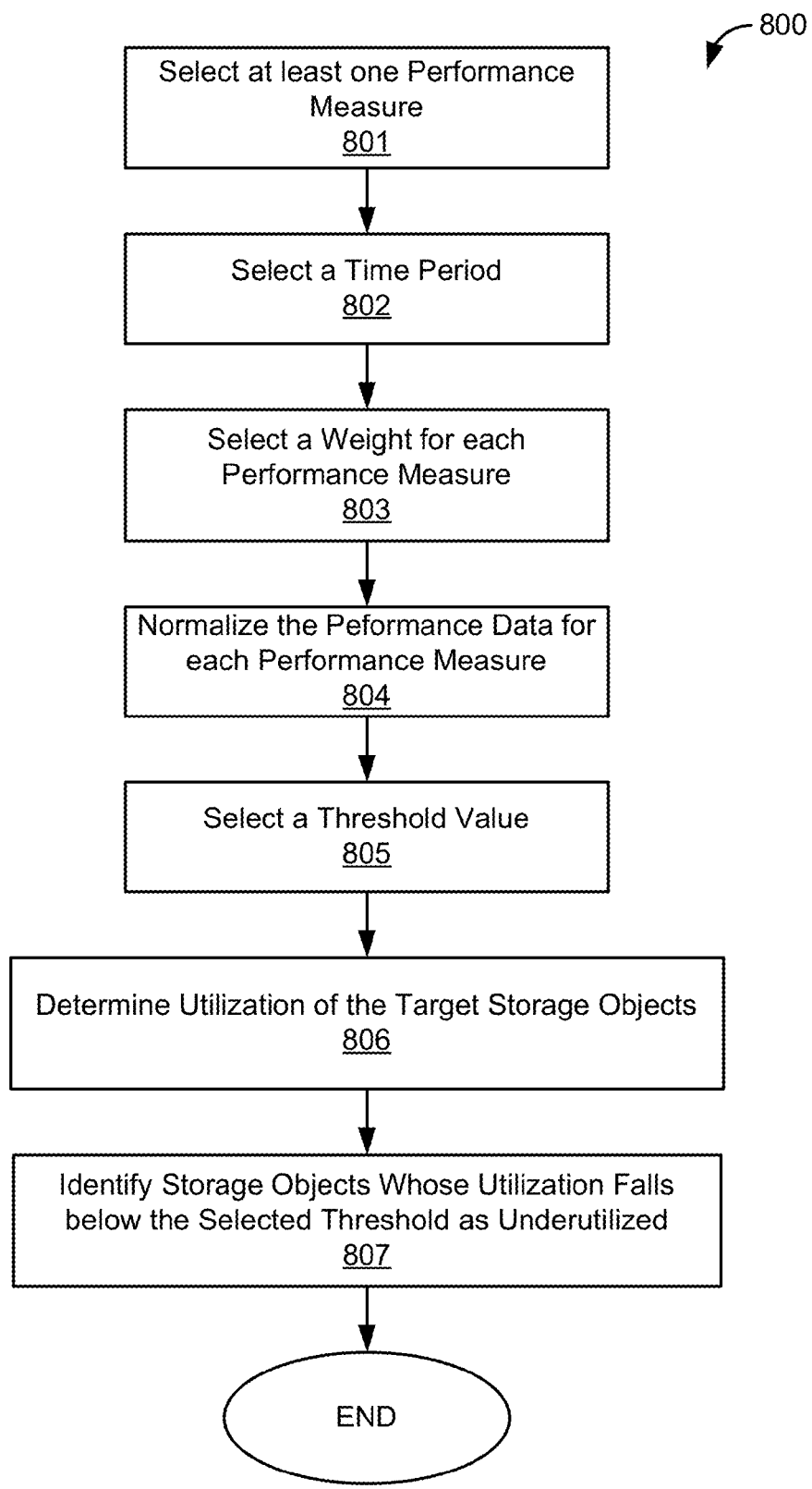
FIG. 8 depicts a flow diagram illustrating the step of analyzing the retrieved data and identifying underutilized capacity as specified in the request according to an embodiment.

Step 705 of the flow diagram 700 is illustrated in further detail according to an embodiment by the flow diagram 800 depicted in FIG. 8. At step 801, at least one performance measure is selected. The performance measure(s) may be specified in the request or determined in advance. For example, Input/Output Operations Per Second (IOPS) and/or Response Time may be used as the performance measures. At step 802, a time period is determined. The time period may be specified in the request or determined in advance. At step 803, a weight is selected for each performance measure. The weight of a performance measure may correspond to the level of importance of the performance measure in indicating storage utilization. In some embodiments, the weight of a performance measure may indicate a level of correlation between the performance measure and storage utilization. In these embodiments, some performance measures may be directly indicative of the level of storage utilization and thus have a higher correlation level and weight and some performance measures may be indirectly indicative of the level of storage utilization and thus have a relatively lower correlation level and weight. In some embodiments, a first weight is selected for a first performance measure, a second weight is selected for a second different performance measure, etc. For example, according to one embodiment, if the first performance measure (e.g., IOPS) is determined to be more indicative of storage utilization than the second performance measure (e.g., response time), the first performance measure is assigned a higher weight than the second performance measure.

At step 804, the performance data collected for each performance measure during the time period is normalized to produce a standardized value for each performance measure for each storage object during the time period. Normalizing the performance data for each performance measure allows different types of performance data to be evaluated on the same scale. The performance data collected for each performance measure may comprise a plurality of values for the performance measure during the time period. A representative value that represents the values of each performance measure for the time period may be determined. In some embodiments, the representative value comprises the average or mean value of a performance measure for the time period. The representative value for each performance measure may then be normalized/standardized to a same predetermined standardized scale (e.g., from 0-1, or 0-10, etc.). In some embodiments, the standardized scale and standardized value for each performance measure is based on the normal range of values for the performance measure typically produced for the performance measure. For example, if a standardized scale of 0-10 is used, the standardized value of 0 may correspond to the lowest typical value for the performance measure typically encountered, whereas the standardized value of 10 may correspond to the highest typical value for the performance measure typically encountered. In other embodiments, standardized performance values may be produced through any known technique, such as multiplying each representative value by a predetermined coefficient.

At step 805, a threshold value is selected. The threshold value may be based on the number of performance measures to be evaluated and the standardized scale used in step 804 and. In some embodiments, the threshold value may increase as the number of performance measures to be evaluated is increased. For example, if one performance measure is to be evaluated and the standardized scale of 0-10 is used, the threshold value may equal 5. As another example, if two performance measures are to be evaluated and the standardized scale of 0-10 is used, the threshold value may equal 10 (comprising a threshold value of 5 for each performance measure). The threshold value may be specified in the request or determined in advance.

At step 806, utilization of target storage objects within the system is determined based on an overall standardized value for each target storage object. Target storage objects are determined in accordance with the criteria specified in the request. For example, if the request specifies a particular business unit, then target storage objects are only those storage objects within that business unit. The overall standardized value for a target storage object may be determined based on the weight and standardized value for each performance measure. In some embodiments, the overall standardized value for a target storage object may be determined using the below equation:

$$\text{Overall\_Standardized\_Value} = (\text{Weight\_}A * \text{Standardized\_Value\_PerformanceMeasure}A) + (\text{Weight\_}B * \text{Standardized\_Value\_PerformanceMeasure}B)$$

For example, if IOPS having a weight of 0.9 and response time having a weight of 0.3 is used, the equation comprises:

$$\text{Overall\_Standardized\_Value} = (0.9 * \text{Standardized\_Value\_IOPS}) + (0.3 * \text{Standardized\_Value\_ResponseTime})$$

At step 807, target storage objects (storage objects being analyzed) whose utilization falls below the selected threshold value are identified as underutilized. This may be represented as:

$$\text{Overall\_Standardized\_Value} < \text{Threshold\_value}$$

For example, if a threshold value of 10 is used for two performance measures, this may be represented as:

$$\text{Overall\_Standardized\_Value} = (\text{Weight\_}A * \text{Standardized\_Value\_PerformanceMeasure}A) + (\text{Weight\_}B * \text{Standardized\_Value\_PerformanceMeasure}B) < 10.$$

C. Client System

As described above, according to some embodiments, the environment includes at least one client 160. The client is the portal from which a user may obtain information about the underutilized capacity within the system. From the client, a user may access a user interface that enables the user to specify parameters for a request for performance information. These parameters may include business units or tiers within the system, performance thresholds, and a time range. On the client, the user can see reports that illustrate underutilized capacity in accordance with the specified parameters.

As illustrated in FIG. 4D, in embodiments in which the computer system 400 is configured as a client 160, the memory 428 may include a client application 1250 or, alternatively, a web browser (not pictured). The client application 1250 may include a configuration module 1260 and a user interface module 1265. In embodiments that include a web browser, the configuration and user interface modules reside in the data analysis engine 1210.

D. Reporting

Figure 9:
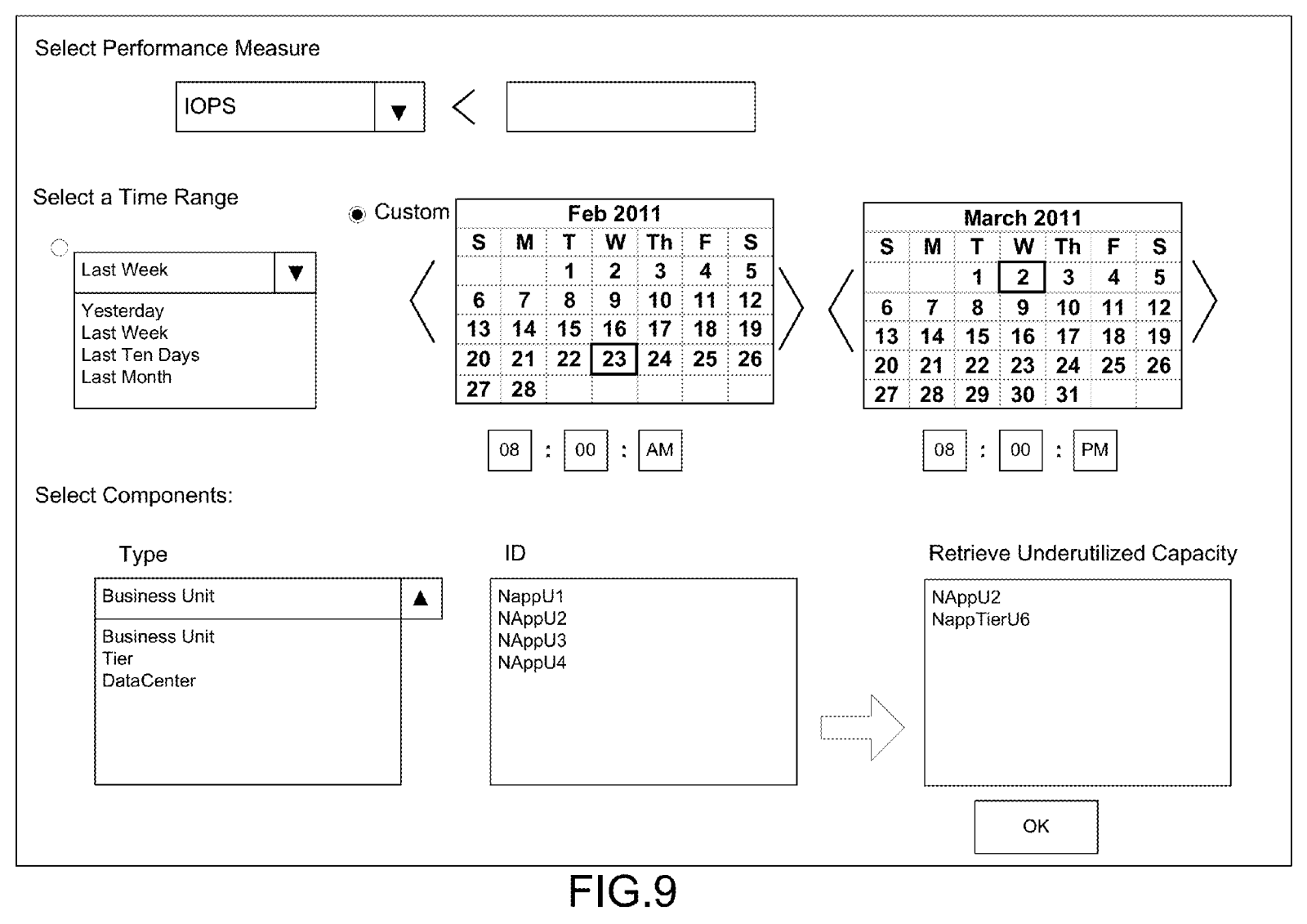

An example user interface screen and a report generated according to various embodiments of the invention are illustrated in FIGS. 9 and 10, respectively. The user interface screen depicted in FIG. 9 allows the user to generate a report identifying underutilized capacity. In this embodiment, the user is prompted to specify a performance measure and a threshold value that are used in in steps 801 and 802, respectively, of the procedure described above. To identify storage objects that are unused, the user may specify a zero or other value corresponding to dormancy or a complete lack of access. The user is prompted to specify a time period. The 'Interval' field includes a list of common or typical time ranges, such as Yesterday, Last Week, Last Ten Days, and Last Month. The user is also given the option of specifying a custom interval using 'Start' and 'End' calendars. In addition to selecting dates, the user may also specify times using the accompanying drop-down menus. The user may optionally specify a sub-section of the storage environment. The 'Type' field is a drop-down menu that enables the user to list sub-sections of the environment by type; the illustrated example allows the user to select business unit, tier, or data center. Upon selection of a sub-section type, the 'ID' field displays a list of sub-sections within the environment of the selected type. In the illustrated example, there are four business units within the environment: NAppU1, NAppU2, NAppU3, and NAppU4. Double-clicking on an item within the 'ID' field adds it to the 'Retrieve Underutilized Capacity' field, which lists the sub-sections of the storage environment to include in the report generated upon clicking 'OK'.

FIG. 10 depicts a report generated from the user interface screen of FIG. 9. Above the table listing the performance information, the report lists the time period to which the information relates and the selected performance measure and threshold. Performance information may be provided at varying levels of granularity. In the illustrated example, the table lists the business unit, application, tier, and storage array that an underutilized storage volume belongs to. Also listed are the actual performance figures in terms of raw capacity and allocated capacity. In one series of embodiments, the fields to be displayed may be selected in a separate configuration view (not pictured).

III. Computer Implementation

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Returning to FIG. 4A, according to an embodiment, the exemplary computer system 400 comprises processor(s) 426, memory 428, a local storage 492, a network adapter 495, an output component 497, and an input component 498 coupled by a bus 446. The processors 426 are the central processing units (CPUs) of the computer system 400 and, thus, control the overall operation of the computer system 400. Server processors 426 may include one or more programmable general-purpose or special-purpose microprocessors, digital signal processors (DSPs), programmable controllers, application specific integrated circuits (ASICs), programmable logic devices (PLDs), or the like, or a combination of such devices.

The network adapter 495 may comprise mechanical, electrical, and signaling circuitry needed to connect the computer system 400 to the network and to receive and transmit data over the network. The network adapter 495 comprises a plurality of ports adapted to couple the computer system 400 to one or more other computer systems (such as servers 110, storage systems 100, or other clients 160) over point-to-point links, wide area networks, virtual private networks implemented over a public network (Internet) or a shared local area network. The network adapter 495 thus may comprise the mechanical, electrical and signaling circuitry needed to connect the server to the network. The network adapter 495 may comprise a network port controller (e.g., Ethernet cards, fibre channel adapters, etc.), specialized network adapters, or any other physical device that controls the receiving and transmitting of data over a network.

The output component 497 may be of any type generally used by a computer system to provide information to an end user (e.g., administrator). For example, the output component 497 could include a monitor, an audio speaker, or an alphanumeric display. Similarly, the input component 498 may be of any type that allows an end user to provide input into a computer system. For example, the input component 498 may be a keyboard, a mouse, or a speech recognition system. In some embodiments, the output component 497 comprises a monitor or television that displays a visual interface. In some embodiments, the input component 498 may be used by an administrator for interacting with and providing input to the computer system 400.

Memory 428 comprises storage locations that are addressable by the processor and adapters, as well as other devices for storing software program code such as the software described herein. The processors and adapters may, in turn, comprise processing elements and/or logic circuitry configured to execute the software code. Memory 428 can be a random access memory (RAM), a read-only memory (ROM), or the like, or a combination of such devices. Memory 428 is for storing software program instructions and data structures, such as an operating system and various software modules. It will be apparent to those skilled in the art that other processing and memory means, including various computer readable media, may be used for storing and executing program instructions pertaining to the invention described herein.

Local storage 492 may comprise a local writable storage device, such as disk devices, video tape, optical devices, DVD, magnetic tape, flash memory, Magnetic Random Access Memory (MRAM), Phase Change RAM (PRAM), or any other similar media adapted to store information (including data and parity information). Local storage 492 is a storage device that stores data needed or produced by the computer system 400 when performing the embodiments described herein. For example, such data may include historical configuration and performance data received by the computer system 400 (configured as a data acquisition engine 1205) corresponding to various components within the environment. The computer system 400 loads data stored on the local storage 492 into memory 428 from which they are accessed by processors 426.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A computer-implemented method for identifying underutilized storage objects of a storage system, the method comprising:
providing an analysis engine for performing:
collecting performance data for first and second performance measures for each storage object, the performance data comprising a plurality of values for the first and second performance measures;
receiving parameters comprising a time period, a first weight for the first performance measure, a second weight for the second performance measure, and a threshold value;
for each storage object, using the performance data to produce a first standardized value for the first performance measure by determining a first representative value for the first performance measure during the time period and normalizing the first representative value;
for each storage object, using the performance data to produce a second standardized value for the second performance measure by determining a second representative value for the second performance measure during the time period and normalizing second the representative value;

for each storage object, determining an overall standardized value based on the first weight, first standardized value, second weight, and second standardized value; and for each storage object, determining whether the storage object is underutilized based on the overall standardized value and the threshold value.

2. The method of claim 1, wherein the overall standardized value is determined using the equation:

Overall_Standardized_Value=
(FirstWeight*First_Standardized_Value)+
(SecondWeight*Second_Standardized_Value).

3. The method of claim 1, wherein a performance measure comprises Throughput, Response Time, or Input/Output Operations Per Second (IOPS).

4. The method of claim 1, wherein:
the performance data for each performance measure comprises a plurality of values for the performance measure for the time period; and
the representative value for each performance measure comprises an average or mean of the plurality of values for the time period.

5. The method of claim 1, wherein the first and second standardized values are determined using a standardized scale based on a normal range of values for the first and second performance measures.

6. The method of claim 1, wherein the first weight indicates a level of correlation between the first performance measure and storage utilization and the second weight indicates a level of correlation between the second performance measure and storage utilization.

7. The method of claim 1, wherein the storage object comprises a storage array, a volume, a logical unit, or storage device.

8. A system for identifying underutilized storage objects of a storage system, the system comprising:
an analysis engine configured for:
collecting performance data for first and second performance measures for each storage object, the performance data comprising a plurality of values for the first and second performance measures;
receiving parameters comprising a time period, a first weight for the first performance measure, a second weight for the second performance measure, and a threshold value;
for each storage object, using the performance data to produce a first standardized value for the first performance measure by determining a first representative value for the first performance measure during the time period and normalizing the first representative value;
for each storage object, using the performance data to produce a second standardized value for the second performance measure by determining a second representative value for the second performance measure during the time period and normalizing second the representative value;
for each storage object, determining an overall standardized value based on the first weight, first standardized value, second weight, and second standardized value; and for each storage object, determining whether the storage object is underutilized based on the overall standardized value and the threshold value.

9. The system of claim 8, wherein the overall standardized value is determined using the equation:

Overall_Standardized_Value=
(FirstWeight*First_Standardized_Value)+
(SecondWeight*Second_Standardized_Value).

10. The system of claim 8, wherein a performance measure comprises Throughput, Response Time, or Input/Output Operations Per Second (IOPS).

11. The system of claim 8, wherein:
the performance data for each performance measure comprises a plurality of values for the performance measure for the time period; and
the representative value for each performance measure comprises an average or mean of the plurality of values for the time period.

12. The system of claim 8, wherein the first and second standardized values are determined using a standardized scale based on a normal range of values for the first and second performance measures.

13. The system of claim 8, wherein the first weight indicates a level of correlation between the first performance measure and storage utilization and the second weight indicates a level of correlation between the second performance measure and storage utilization.

14. The system of claim 8, wherein the storage object comprises a storage array, a volume, a logical unit, or storage device.

15. A non-transitory computer readable medium having instructions stored thereon when executed by a processor, identify underutilized storage objects of a storage system, the non-transitory computer readable medium comprising instructions for:
collecting performance data for first and second performance measures for each storage object, the performance data comprising a plurality of values for the first and second performance measures;
receiving parameters comprising a time period, a first weight for the first performance measure, a second weight for the second performance measure, and a threshold value;
for each storage object, using the performance data to produce a first standardized value for the first performance measure by determining a first representative value for the first performance measure during the time period and normalizing the first representative value;
for each storage object, using the performance data to produce a second standardized value for the second performance measure by determining a second representative value for the second performance measure during the time period and normalizing second the representative value;
for each storage object, determining an overall standardized value based on the first weight, first standardized value, second weight, and second standardized value; and
for each storage object, determining whether the storage object is underutilized based on the overall standardized value and the threshold value.

16. The non-transitory computer readable medium of claim 15, wherein the overall standardized value is determined using the equation:

Overall_Standardized_Value=
(FirstWeight*First_Standardized_Value)+
(SecondWeight*Second_Standardized_Value).

17. The non-transitory computer readable medium of claim 15, wherein a performance measure comprises Throughput, Response Time, or Input/Output Operations Per Second (IOPS).

18. The non-transitory computer readable medium of claim 15, wherein:
- the performance data for each performance measure comprises a plurality of values for the performance measure for the time period; and
- the representative value for each performance measure comprises an average or mean of the plurality of values for the time period.

19. The non-transitory computer readable medium of claim 15, wherein the first and second standardized values are determined using a standardized scale based on a normal range of values for the first and second performance measures.

20. The non-transitory computer readable medium of claim 15, wherein the first weight indicates a level of correlation between the first performance measure and storage utilization and the second weight indicates a level of correlation between the second performance measure and storage utilization.

21. The non-transitory computer readable medium of claim 15, wherein the storage object comprises a storage array, a volume, a logical unit, or storage device.

* * * * *